Oct. 13, 1953     F. L. O. ROEHRIG     2,655,084
SWING LENS CAMERA
Filed Jan. 10, 1951
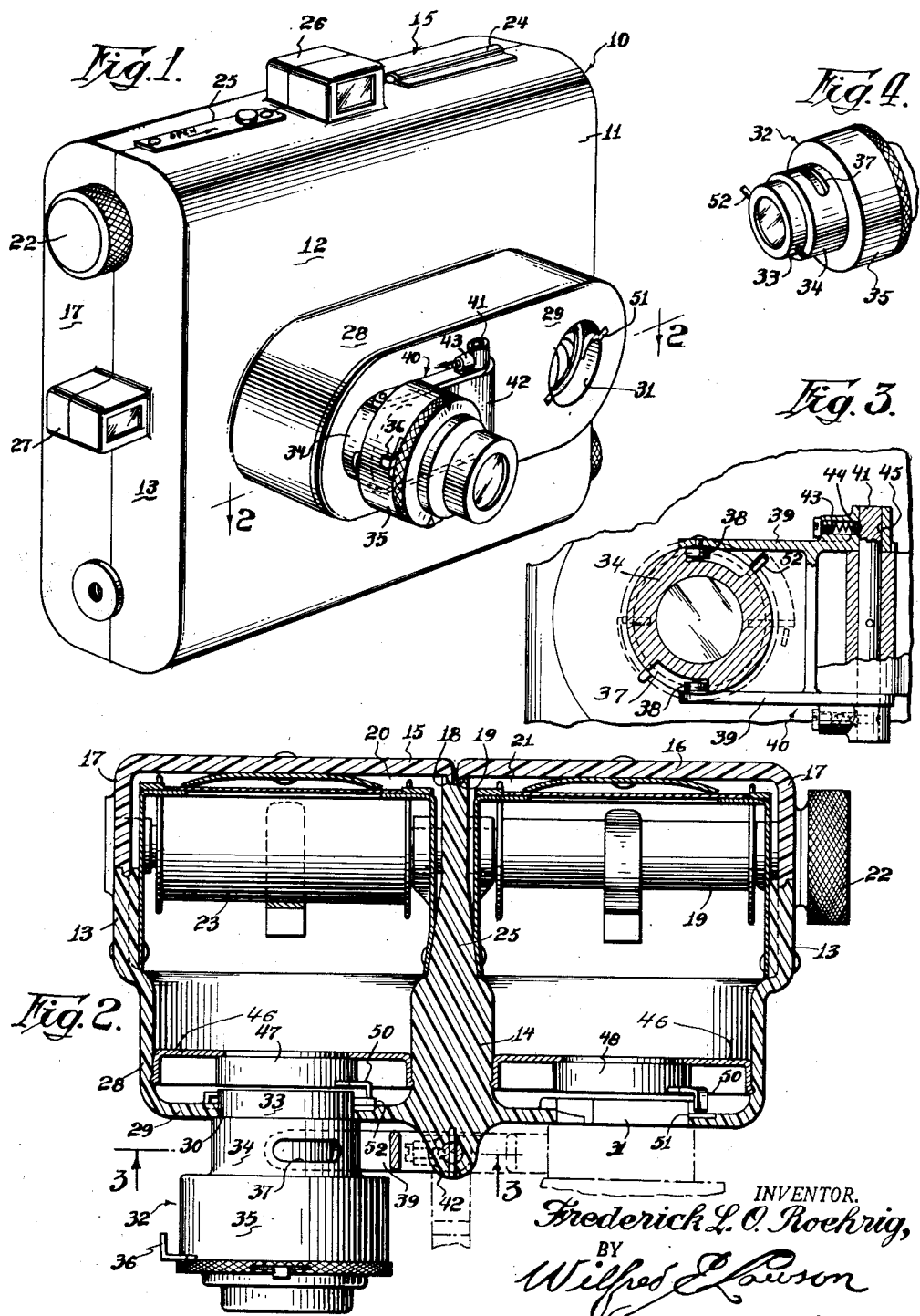
INVENTOR.
Frederick L. O. Roehrig,
BY
Wilfred Lawson
Attorney.

Patented Oct. 13, 1953

2,655,084

UNITED STATES PATENT OFFICE 2,655,084

SWING LENS CAMERA

Frederick L. O. Roehrig, Yucaipa, Calif.

Application January 10, 1951, Serial No. 205,238

5 Claims. (Cl. 95—11)

This invention relates to photograph apparatus and more particularly to a camera having two films which may be separately exposed. The general objective of the invention is to provide a novel camera construction having two films and a single lens so arranged that pictures may be taken on either film, the lens being so mounted as to be shifted in position for exposing either of the films.

A more particular object of the invention is to provide a two-film camera having two exposure chambers, each provided with a shutter and a lens mounting adapted to be shifted in position from one exposure chamber to the other.

Another object of the invention is to provide a two-film camera construction utilizing a single lens and having a pair of exposure chambers provided with protective shutters, the lens being mounted so as to be shifted from one exposure chamber to the other in a manner to open the protective shutter of the exposure chamber with which the lens mounting is associated when the lens is placed in position.

An additional object of the invention is to provide a novel camera construction as set forth in the preceding object wherein the protective shutter of the respective exposure chamber is closed when the lens is shifted to the other exposure chamber.

Another object of the invention is to provide a plural film camera of novel construction utilizing a single lens system and wherein one of the film chambers can be opened for removal or replacement of the film without affecting the remaining films in the camera.

Other objects and advantages will appear and be brought out more fully in the following specification, reference being had to the accompanying drawing.

In the drawing:

Figure 1 is a perspective view of a two-film camera embodying my invention;

Figure 2 is a sectional view taken along the line 2—2 of Figure 1;

Figure 3 is a partial view in section, the section being taken along the line 3—3 of Figure 2;

Figure 4 is a perspective view of the lens tube and shutter casing shown also in Figures 1 and 2.

Referring more particularly to the drawing, I show a box like camera 10 having a front section 11 comprising a front wall 12, side walls 13 and an intermediate wall 14 which extends rearwardly from front wall 12 and is preferably formed integrally therewith. The camera has a pair of back section 15 and 16 each formed with a side wall 17 which mates with the adjacent wall 13 of the front section and flanges 18 which fit in a groove 19 in intermediate wall 14 of the front section 11. Thus two compartments or exposure chambers 20 and 21 are provided for mounting a pair of films, the construction of intermediate wall 14 being such as to provide a light seal between the two compartments. A film winding spindle having a winding knob 22 extends through each side wall 17 of each compartment and conventional shaft sections are provided in each compartment for receiving film rolls 23. A hinge 24 is provided in back sections 15 and 16 by which they are secured to the front section 11 and a latch 25 for the back sections of any desired type is also provided, a hinge 24 and a latch 25 being positioned on each end of the camera for the respective back sections in alternate arrangement as should be clear. A pair of sights 26 and 27 of any desired form are shown on what may be considered the top and side of the camera.

Front wall 12 has an elongate or substantially elliptical extension wall portion 28 disposed transversely of the intermediate wall 14. This extension wall has a front wall portion 29 having openings 30 and 31 to receive a portion of a lens housing indicated generally at 32.

The lens housing comprises the lens tube 33 having a collar 34 and a shutter casing 35 containing a shutter actuated by a shutter lever 36 which extends outwardly from the casing 35. The collar 34 has a pair of diametrically disposed circumferentially directed recesses 37 in which are disposed a pair of rollers 38 mounted at the outer ends respectively of a pair of arms 39 forming parts of a bracket 40 which is pivotally mounted on wall 29. A pivot pin 41 is secured against rotation in a boss or other enlargement of wall 29 and arms 39 of bracket 40 have suitable pivot bearing coupling with the ends of pin 41. The bearing portions of arms 39 are each formed to provide suitable mountings for a latch 43 which is shown as comprising a spring seated ball 44 engageable in a pair of diametrically disposed depressions 45 in pin 41.

A bracket 46 is suitably secured in each exposure chamber and the brackets respectively carry shutters 47 and 48 adjacent openings 30 and 31 of wall 29, the shutters each having an operating lever 50. The wall 29 is formed with pairs of bayonet slots 51 in openings 30 and 31 and diametrically disposed pins 52 extend radially from the lens tube 33 for engagement in bayonet slots 51.

The configuration of bayonet slots 51 is such that when the lens tube 32 is secured in either of the openings 30 or 31 and given a right hand turn of about 45° the lens housing will be securely positioned with the collar 34 being pressed against the face of wall 29. The position of each auxiliary shutter lever 50 is such as to be engaged by one of the pins 52 so as to operate its respective shutters 47 or 48 to open position. The reverse movement of shutter housing of lens housing 32 will permit the associated shutter lever 50, which is spring seated, to return to shutter closing position. The support of lens housing 32 from bracket 40 is such that the lens housing can be rotated so as to permit engagement of tube 33 in either opening 30 or 31 by swinging bracket 40 through a half circle arc. Latches 43 will resist such movement due to the engagement of balls 44 in depressions 45 of pivot pin 41.

The operation of the invention should be apparent from the above description. Figure 2 shows the camera with the lens housing 32 in operative position for exposure of a film in film compartment or chamber 20 with auxiliary shutter 47 open and upon operation of lens shutter 36 pictures may be taken by exposure of the film in this compartment. When it is desired to expose the film in compartment 21, lens housing 32 may be shifted by left hand turn of the housing which releases tube 33 from opening 30 and shutter lever 50 is operated to close shutter 47. The lens tube may then be swung around through the half circle arc, and tube 33 inserted in opening 31 and upon being secured by a right hand turn shutter lever 50 of auxiliary shutter 48 will be actuated to open this shutter. Film in compartment 20 may now be exposed in conventional manner.

Among the advantages of a dual chamber camera of the character shown and described is the fact that many camera "fans" prefer to take pictures using both color and ordinary black and white film. Conventional use of such film requires either two cameras or the exposure of a single roll of film of each type in a single camera, whereas it is frequently desirable to take one or two "shots" of one type and then shift to the other type which has many disadvantages as will be obvious. By the provision of a dual film camera, according to this invention, all of the advantages of two such cameras are possible in a single camera unit which requires only one objective lens, which lens is usually the most expensive part of a camera.

While in the foregoing there has been shown and described the preferred form of this invention, it is to be understood that minor changes in the details of construction, combination and arrangement of parts may be resorted to without departing from the spirit and scope of the invention as claimed.

I claim:

1. In a dual chamber camera, a film housing having a division wall forming two film exposing compartments, a front wall of the housing being common to the two compartments and having two lens tube apertures each opening into a compartment, a lens tube having an end adapted for selective insertion into said apertures, a bracket pivoted on said front wall between said apertures to turn on an axis lying in the plane of and paralleling said division wall, said bracket including two spaced arms extending perpendicularly to said axis, said lens tube being positioned between said arms, a pivot coupling between the arms and the lens tube by which the tube turns between the arms on an axis paralleling the first axis, said arms being of a length to permit the insertion of said end of the lens tube selectively into said wall apertures when the bracket is swung around the first axis, and means for locking the end of the lens tube in either aperture.

2. The invention according to claim 1, with said locking means comprising a pin carried by and extending radially of the said end of the lens tube, a bayonet slot in the edge of the aperture to receive said pin and opposite circumferentially directed slots in the outer wall of the lens tube receiving the pivot couplings between the arms and the tube whereby the tube is rotatable on its longitudinal axis.

3. The invention according to claim 2, with a shutter disposed over each aperture adjacent to the inside of said front wall and an actuating lever connected with each shutter and disposed adjacent to said bayonet slot, said pin being adapted to engage the shutter lever and actuate the shutter when the pin is moved to locking position in the bayonet slot.

4. In a dual chamber camera, a film housing having a division wall forming two film exposing compartments, a front wall of the housing being common to the two compartments and having two lens tube apertures each opening into a compartment, a lens tube having an end adapted for selective insertion into said apertures, a pivot pin, means securing the pin to the face of said front wall in the plane of and parallel with said division wall, a bracket comprising a pair of spaced parallel arms, said arms being pivotally connected at one end of the bracket with the ends of said pivot pin to swing around the pin, a roller member rotatably supported upon the inner side of each arm at the outer end thereof, said lens tube being positioned between the said outer ends of the arms and having oppositely positioned circumferentially directed slots each having a roller engaged therein whereby the lens tube is partially rotatable on its long axis between the arms, the roller connection between the arms and the lens tube facilitating the turning of the tube between the arms on an axis parallel with said pivot pin, said arms being of a length to permit the insertion of said end of the lens tube selectively into said wall apertures when the bracket is swung around on said pivot pin, and means for effecting the locking of the said end of the lens tube in an aperture by the said partial rotation of the lens tube on its long axis.

5. The invention according to claim 4, wherein the last means comprises a pin carried by the said end of the lens tube and extending radially outwardly therefrom, and a bayonet slot formed in the edge of each aperture to receive the pin when the said end of the lens tube is inserted into the aperture.

FREDERICK L. O. ROEHRIG.

References Cited in the file of this patent

UNITED STATES PATENTS

| Number | Name | Date |
|---|---|---|
| 1,377,916 | Ochoa | May 10, 1921 |
| 2,259,084 | Rosenhaft | Oct. 14, 1941 |
| 2,315,284 | Thompson | Mar. 30, 1943 |
| 2,396,869 | McDonald et al. | Mar. 19, 1946 |

FOREIGN PATENTS

| Number | Country | Date |
|---|---|---|
| 202,046 | Great Britain | Aug. 13, 1923 |